United States Patent
Matthews et al.

(10) Patent No.: US 9,350,631 B2
(45) Date of Patent: May 24, 2016

(54) IDENTIFYING FLOWS CAUSING UNDESIRABLE NETWORK EVENTS

(71) Applicant: Broadcom Corporation, Irvine, CA (US)

(72) Inventors: Brad Matthews, San Jose, CA (US); Mohan Kalkunte, Saratoga, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 126 days.

(21) Appl. No.: 14/042,220

(22) Filed: Sep. 30, 2013

(65) Prior Publication Data

US 2015/0092591 A1 Apr. 2, 2015

(51) Int. Cl.
*H04L 12/26* (2006.01)
*H04L 12/801* (2013.01)
*H04L 12/835* (2013.01)

(52) U.S. Cl.
CPC .............. *H04L 43/062* (2013.01); *H04L 47/11* (2013.01); *H04L 47/30* (2013.01)

(58) Field of Classification Search
CPC . H04L 12/5693; H04L 47/2441; H04L 47/28; H04L 49/552; H04Q 11/0478
See application file for complete search history.

(56) References Cited

U.S. PATENT DOCUMENTS 8,817,807 B2 * 8/2014 Suzuki et al. ................. 370/428

* cited by examiner

*Primary Examiner* — Chandrahas Patel
(74) *Attorney, Agent, or Firm* — Sterne, Kessler, Goldstein & Fox PLLC (57) ABSTRACT

A system and method to monitor network congestion is provided. The system includes a plurality of ingress, egress ports, and a plurality of queues coupled to the ingress and egress ports and configured to store incoming and outgoing packets. The system also includes a monitoring unit configured to monitor at least one attribute of packets in at least one queue when a start condition occurs, stop monitoring the attribute when an end condition occurs, determine a flow that caused the start condition based on the monitored attribute, and report the monitored attribute and the flow.

20 Claims, 8 Drawing Sheets

IDENTIFYING FLOWS CAUSING UNDESIRABLE NETWORK EVENTS

BACKGROUND

1. Field of the Disclosure

The embodiments presented herein are generally related to networks and more specifically to identifying flows that cause undesirable network events.

2. Background Art

Network operators typically spend a substantial amount of time and money on network monitoring devices to determine a cause of congestion in network. For example, in Wall Street high frequency trading, stocks are bought and sold in nanoseconds and as a result trading houses are very sensitive to network delays. Trading houses may run algorithms to maximize profitability. Such algorithms depend on a fast network. Due to a slow network, trading houses may miss a trading window to buy or sell stocks or they may have stale trading data. Any sort of delay in trading where millions of trades per minute are generated can be a critical bottleneck. Trading houses may allege that the network at stock exchange is responsible for the delays while the stock exchange may allege that the network or computers at the trading houses are responsible for the delays. Thus it becomes critical to pinpoint the cause of congestion in a network.

BRIEF DESCRIPTION OF THE DRAWINGS/FIGURES

Reference will be made to the embodiments of the disclosure, examples of which may be illustrated in the accompanying figures. These figures are intended to be illustrative, not limiting. Although the embodiments presented herein are generally described, it should be understood that the embodiments are not intended to limit the scope to these particular examples.

The embodiments of the disclosure will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

This specification discloses one or more embodiments that incorporate the features of the disclosure. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

For clarity and ease of illustration, not all functional blocks are illustrated in detail because these items are known to those of ordinary skill in the art, and are further defined in well known standards. Furthermore, it is to be appreciated that similar or substitute functional blocks may be used to implement embodiments of the disclosure without deviating from the scope of the present disclosure.

It is also to be appreciated that for clarity and ease of illustration, not all steps are illustrated in detail in the flowcharts in FIGS. 3-7 because these items are known to those of relevant skill in the art, and are further defined in well known standards. Furthermore, it is to be appreciated that similar or substitute steps may be used to implement embodiments of the disclosure without deviating from the scope of the present disclosure.

Figure 1:
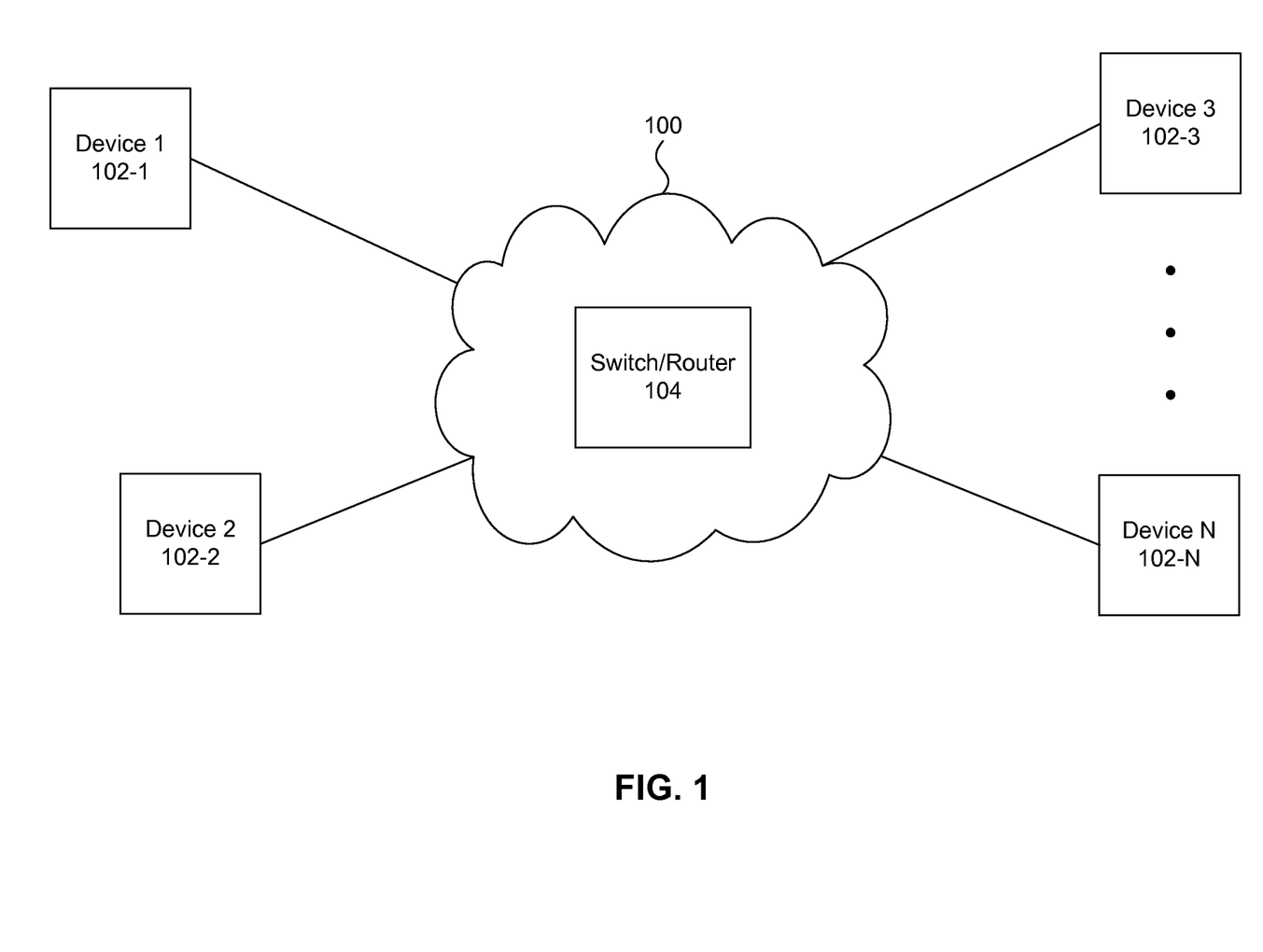
FIG. 1 illustrates an example network.

FIG. 1 illustrates an example network 100. Network 100 includes a device 104. Devices 102-1 to 102-N are coupled to network 100.

Device 104 may be, for example, a switch or a router that routes data within network 100 and to/from devices 102. It is to be appreciated that device 104 is any kind of switching, routing, wired or wireless communication device. Device 104 may be referred to as switch 104 herein. Devices 102 may be, for example personal computers, laptops, or any kind of wired or wireless device that can communicate with network 100. Network 100 may be, for example, a Local Area Network (LAN) running an Ethernet 802.3 standard. In an example, network 100 may be part of a financial network such as the New York Stock exchange and the devices 102 may be, for example, computers in Wall Street trading houses. It is to be appreciated that the kind of network protocol in use for network 100 is a design choice and may be arbitrary.

Network operators typically spend a substantial amount of time and money on network monitoring devices to determine a cause of congestion in network 100. Congestion typically occurs when one or more queues, for example in switch 104, exceeds a certain length resulting in packets being dropped and a resulting slowdown of traffic in network 100. In financial networks such as Wall Street trading houses, it is critical to determine which flows are causing congestion in network 100. The monitoring devices that determine cause of congestion in network 100 typically reside outside of network 100 and/or device 104, and collect network statistics passively as data passes through the network 100. Such devices maybe, for example, any of devices 102. However, such devices 102 have a limited view of network conditions and are unable to identify flows that cause congestion in network 100.

In Wall Street high frequency trading, stocks are bought and sold in nanoseconds and as a result trading houses are very sensitive to delay. Trading houses may run algorithm to maximize profitability. Such algorithms depend on a fast network. Due to a slow network, trading houses may miss a trading window to buy or sell stocks or they may have stale trading data. Any sort of delay in trading where millions of trades per minute are generated can be a critical bottleneck. Trading houses may allege that the stock exchange (e.g. network 100) is responsible for the delays, and the stock exchange may assert that the delay is at the end of the trading houses (e.g. in devices 102). Thus it becomes critical to pinpoint the application, user, or flow that is causing the congestion. Furthermore, network providers can guarantee service level agreements (SLAs) for latency if they can pinpoint sources of congestion and implement solutions to prevent congestion.

Accordingly, the inventors have provided systems and methods to monitor specific attributes of packets/queues and/or buffer packets with certain attributes when an undesirable event such as network congestion occurs, stop monitoring the attribute(s) or buffering certain packets when a predetermined end condition occurs, determine a flow that caused the undesirable event based on the monitored attribute(s) and/or buffered packets, and report the monitored attributes and the flow causing congestion, for example, to a network operator or to a processor that generates a report on the cause of the congestion.

A "flow" or "traffic flow", as the term is used herein, refers to a sequence of data packets that are related. Traffic flows may be defined at various levels of granularity. For example, a flow may be created between a source and a destination (e.g., between a source address and a destination address), or between a program running on a source and a program on a destination (e.g., between source and destination addresses as well as protocol or port number). The addresses may be at the layer 2 media access control layer (MAC layer addresses), network layer (e.g. IP addresses), or other higher layer address. Port numbers or protocol identifiers can identify particular applications. The destination of a flow may be a single node or multiple nodes, such as in multicast flows from a source to multiple destinations. Packets originating from a particular application can constitute a flow. For example, audio packets may constitute an audio flow, video packets a video flow, and data packets a data flow.

Figure 2:
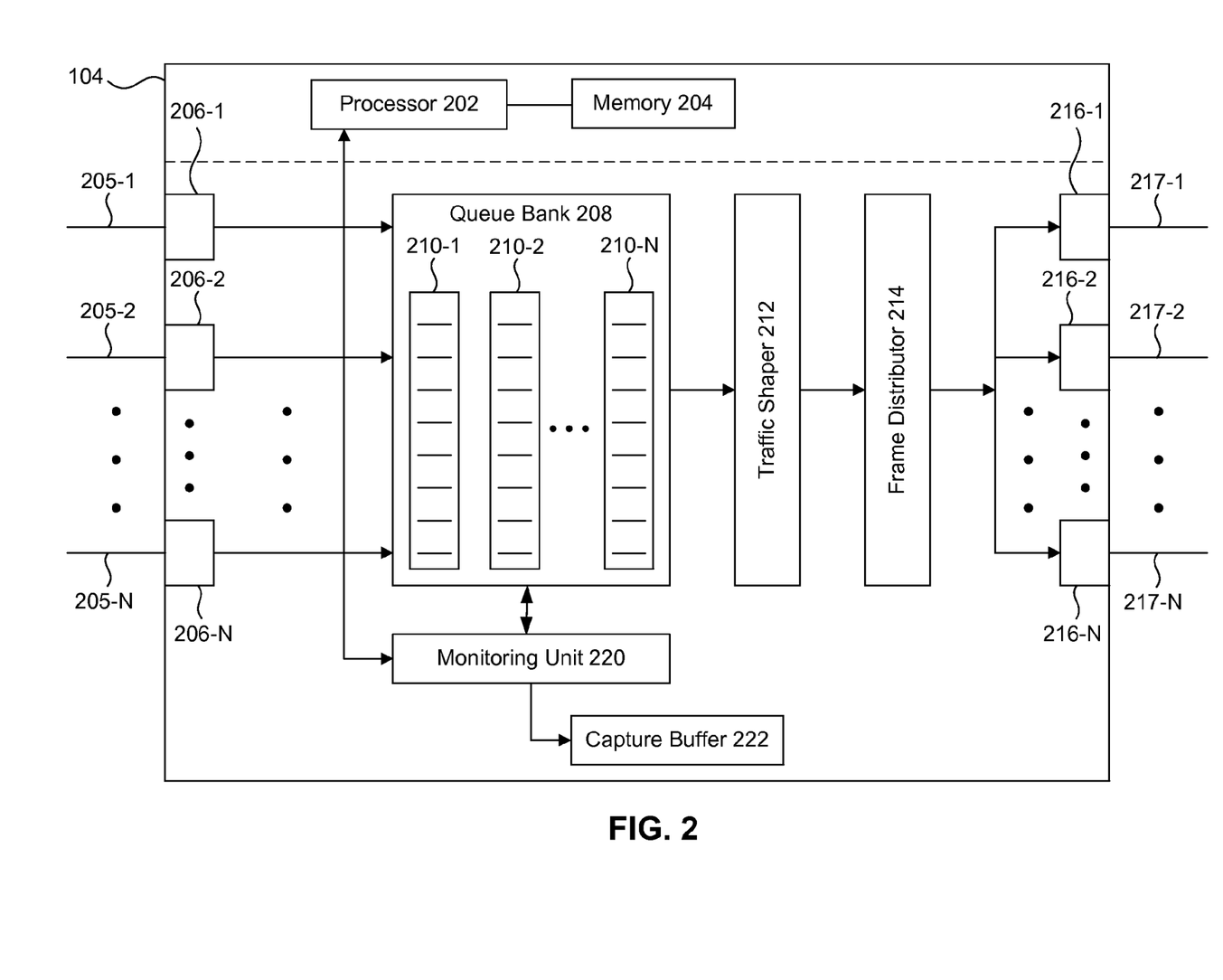
FIG. 2 illustrates a switch to monitor congestion in a network in further detail according to an embodiment of disclosure.

FIG. 2 illustrates a switch 104 to monitor congestion in further detail according to an embodiment of disclosure.

Switch 104 may be considered to be logically divided into a control plane 201 and a packet forwarding plane 203. Control plane 201 includes a processor 202 coupled to a memory 204. Packet forwarding plane 203 includes ingress ports 206-1 to 206-N coupled to ingress links 205-1 to 205-N. Ingress ports 206 are coupled to queue bank 208. Queue bank 208 includes multiple queues 210-1 to 210-N. In an example, the queues 210 may be Virtual Output Queues (VOQs). VOQs are queues that are associated with one or more ingress ports and egress ports. Any packet arriving on an ingress port associated with a VOQ will be routed to that VOQ. The VOQ will then direct the packet to the associated egress port. The queue length of a VOQ is known as a virtual queue length. Queues 210 may be output queues bound directly to an egress port or intermediate queues used to stage traffic e.g. multicast staging queues. Queue bank 208 is coupled to traffic shaper 212. Traffic shaper 212 is coupled to frame distributor 214 (also referred to a scheduler), which in turn is coupled to egress ports 216-1 to 216-N. Egress ports 216-1 to 216-N are coupled to egress links 217-1 to 217-N respectively. Switch 104 also includes a monitoring unit 220 coupled to queue bank 208 and processor 202. Monitoring unit 220 is optionally coupled to a capture buffer 222. In an example, capture buffer 222 is a part of memory 204.

Data arrives via ingress links 205 and is forwarded by ingress ports 206 to queues 210 in queue bank 208. In an example, queues 210 may be configured to store packets corresponding to a particular flow or multiple flows. Packets from queues 210 are forwarded to traffic shaper 212. Traffic shaper 212 controls a volume of packets transmitted via egress ports 216 in a specified period (i.e. bandwidth throttling), or the maximum rate at which packets are transmitted via egress ports 216 (i.e. rate limiting). Traffic shaper 212 forwards packets received from queue bank 208 to frame distributor 214. Frame distributor 214 determines a port 216 to transmit a packet on. Ports 216 transmit packets via links 217.

According to an embodiment of the disclosure, monitoring unit 220 monitors at least one attribute of the packets in at least one of the queues 210 when a start condition occurs. An example start condition includes a queue length for a queue 210 or a virtual queue length greater than a predetermined threshold or a sum of queue lengths for queues 210 or virtual queue lengths greater than a predetermined threshold. In an example, the start condition may be if utilization of a table that stores routing data exceeds a predetermined threshold. For example, a start condition may be if more than a certain percentage of entries of a Virtual Local Area Network Identification (VID) forwarding table or a Media Access Control (MAC) learning table are in use. A MAC learning table determines which port a packet with a particular MAC address came in on and which port the packet has to egress on based on a station the MAC address is associated with. The start condition may be if more than fifty percent of a MAC learning table or a VID forwarding table is utilized.

Another start condition may be unequal distribution of packets between members of an aggregation group exceeding a predetermined percentage. An aggregation group may be, for example, a Link Aggregation Group (LAG) of egress links or an equal cost multi-path (ECMP) routing group for multiple paths in an Operating Systems Interface (OSI) layer 3 model. Link aggregation is a method of logically bundling two or more physical links to form one logical link. The "logical link" or "aggregated link" formed by a LAG can be considered to have the sum bandwidth or a bandwidth close to the sum bandwidth of the individual links that are bundled. ECMP is an aggregation of multiple paths to the same destination that provides an equal cost distribution between the multiple paths. The start condition may be, for example, if unequal distribution of packets between members of an equal cost multi-path (ECMP) group or member links of a LAG is greater than a predetermined percentage.

In a further example, the start condition may be packets enqueued in a queue for greater than a predetermined time period. In another example the start condition may be queue length, virtual queue length, sum of queue lengths or sum of virtual queue lengths associated with forwarding attribute such ECMP group ID or VID, service attributes such as a class of service (COS), type of application, type of protocol, flow or type of user data greater than a predetermined threshold. For example, if sum of queue lengths storing video flows exceeds a certain length, or queues associated with certain types of data, such as financial trading data, exceeds a certain length then a start condition to monitor attributes of such queues is met.

When a start condition occurs, the monitoring unit 220 may buffer packets or packet headers for all packets in a particular queue, all packets in a queue bound for a particular egress port, all packets bound for a particular aggregation group, or all packets corresponding to a particular forwarding attribute such as VLAN ID or service attribute such as COS in capture buffer 222. In an example, monitoring unit 220 may monitor attributes or buffer packets: for queues 210 or whose queue length or virtual queue length is greater than a predetermined threshold; for queues where a sum of queue lengths or virtual queue lengths is greater than a predetermined threshold; for aggregation groups that have an unequal distribution of packets between members of the aggregation; for tables with utilization greater than a predetermined threshold; for packets enqueued in a queue for greater than a predetermined time period; or for queues that have a queue length, virtual queue length, sum of queue lengths or sum of virtual queue lengths associated with a service attribute such as class of service (COS), forwarding attribute such as VID, type of application, type of protocol, flow or type of user data greater than a predetermined threshold.

When an end condition occurs the monitoring unit 220 stops monitoring the attributes of the packets/queues and/or buffering packets. In an example, the end condition includes one or more of: time elapsed since start condition is greater than a predetermined period of time, a predetermined marking on a dequeued packet is a predetermined value, a queue length or virtual queue length is below a predetermined threshold, a sum of queue lengths or virtual queue lengths is below a predetermined threshold, unequal distribution of packets between members of an aggregation group is less than a predetermined percentage, usage of a table is less than a predetermined threshold, a buffer to store impacted packet information is full, or queue length, virtual queue length, sum of queue lengths or sum of virtual queue lengths, associated with a class of service (COS), Virtual Local Area Network (VLAN) Identification (ID), application, protocol, flow or type of user data less than a predetermined threshold.

In an example, the monitored attributes of packets include one or more of class of service (COS), Virtual Local Area Network (VLAN) Identification (ID), application, protocol, flow, or type of user data in queues that caused the start condition to occur.

In an alternate embodiment, monitoring unit continuously monitors the attributes even before the start condition occurs. When the start condition occurs, monitoring unit 220 already has a snapshot of data in the queues 210 and can either generate a report of the monitored attributes or identify a flow that caused the start condition to occur based on the monitored attributes.

When the end condition occurs, monitoring unit 220 may generate a report that includes the monitored attributes or an identification of the flow(s) that caused the start condition based the monitored attributes. In another example, monitoring unit 220 generates an in-band collection of packet headers by stripping packet headers stored in the capture buffer 222 and concatenating the headers. These concatenated headers can be sent to processor 202 or to a network operator for analysis of which flow caused the start condition. In an in-band collection monitoring unit 220 in packet forwarding plane 203 will do the collection of packets or packet headers without software control from processor 202 in control plane 201.

In another example of monitoring unit 220 generates an out-of-band report based on monitored attributes of packets in queues or packets in capture buffer 222 to determine the flow(s) that caused the start condition. In an out-of-band report, processor 202 in control plane 201 will generate the report instead of monitoring unit 220 in packet forwarding plane 203. An out-of-band report compared to an in-band collection of packets/packet headers may take longer and be more processor-bandwidth intensive due to software control by processor 202 to monitor attributes and generate the report identifying the flow(s) that caused the start condition.

Figure 3:
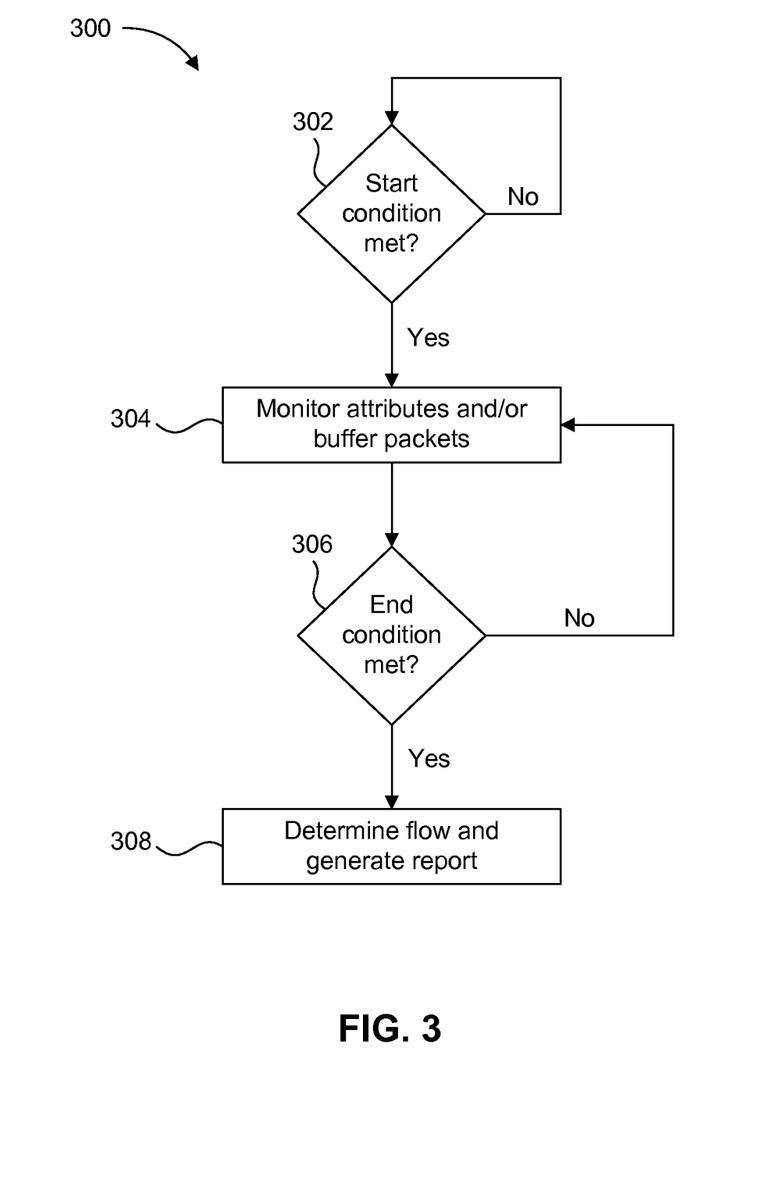
FIG. 3 illustrates an example flow chart illustrating steps to identify a flow that caused network congestion according to an embodiment of the disclosure.

FIG. 3 illustrates an example flow chart 300 illustrating steps to identify a flow that caused network congestion according to an embodiment of the disclosure. Flowchart 300 will be described with continued reference to the example operating environment depicted in FIG. 2. However, the flowchart is not limited to these embodiments. Note that some steps shown in flowchart 300 do not necessarily have to occur in the order shown. The steps in FIG. 3 are performed, for example, by monitoring unit 220.

In step 302, it is determined whether a start condition has occurred. If the start condition has occurred then the process proceeds to step 304. If the start condition has not occurred then the process continues to monitor whether the start condition has occurred in step 302.

In step 304, the monitoring unit 220 monitors attributes of packets/queues or stores packets/headers for queues that caused the start condition in capture buffer 222.

In step 306, it is determined whether an end condition has occurred. If the end condition has occurred, then the process proceeds to step 308. If the end condition has not occurred, then the process continues to monitor attributes or buffer packets in step 304.

In step 308, the flow that caused the start condition is determined and/or a report is generated as described above. In an example, a report of monitored attributes or buffered packets is generated identifying the flow or set of flows that caused the start condition. In another example, the report is a concatenation of buffered packets or headers of buffered packets. The report, buffered packets, or headers of buffered packets may be sent to processor 202 or to a receiver external to switch 104, for example to a device 102. In an example, the report is generated by monitoring unit 220 or processor 202.

Figure 4:
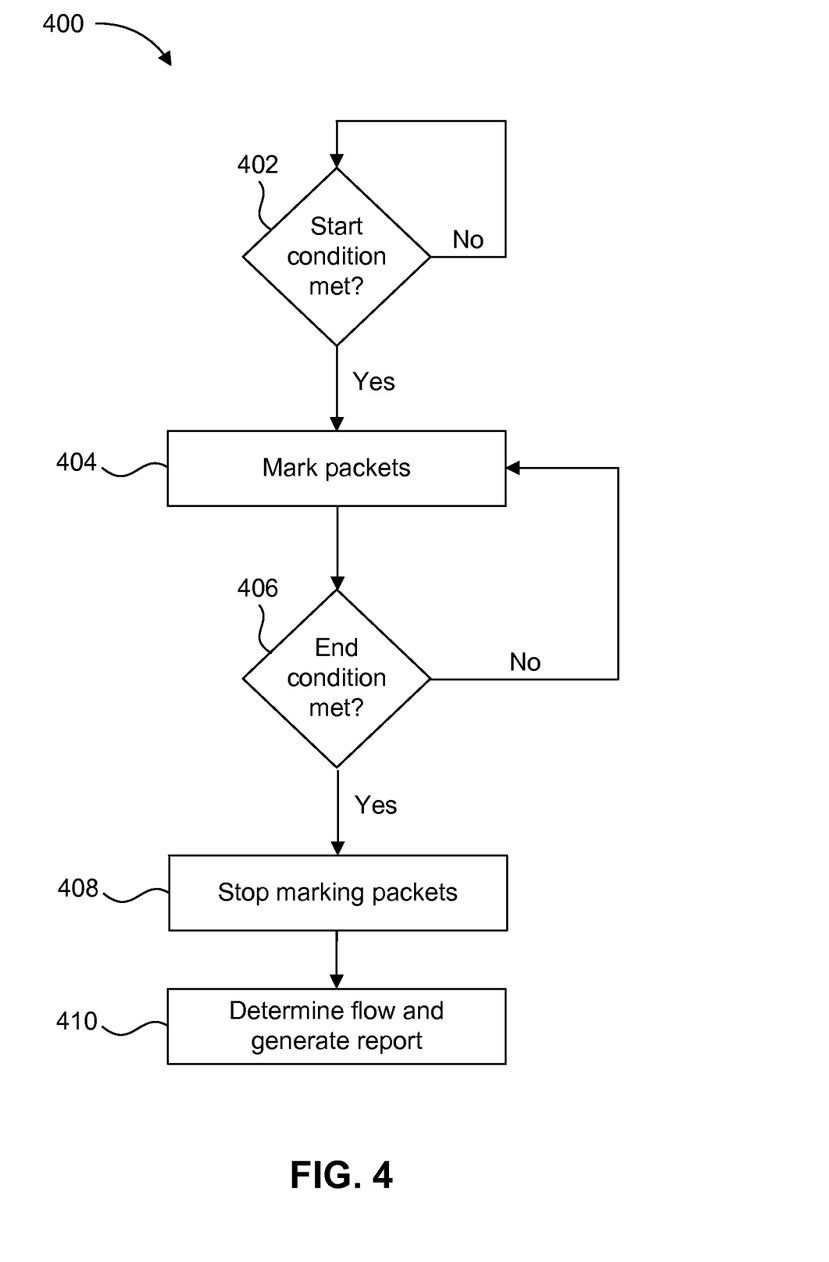
FIG. 4 illustrates an example flow chart illustrating steps to monitor congestion for a single start condition according to an embodiment of the disclosure.

FIG. 4 illustrates an example flow chart 400 illustrating steps to monitor congestion using a single condition capture according to an embodiment of the disclosure. Flowchart 400 will be described with continued reference to the example operating environment depicted in FIG. 2. However, the flowchart is not limited to these embodiments. Note that some steps shown in flowchart 400 do not necessarily have to occur in the order shown. The steps in FIG. 4 are performed, for example, by monitoring unit 220.

In step 402, it is determined whether a start condition has occurred. If the start condition has occurred then the process proceeds to step 404. If the start condition does not occur then the process continues to monitor whether the start condition has occurred in step 402.

In step 404, packets with certain attributes are marked by changing a value in a packet or in metadata associated with the packet from a first value to a second value. In an example, monitoring unit 220 marks packets with certain attributes, for example, packets with a certain forwarding attributes such as VLAN ID or service attributes such as COS or all packets in a queue that exceeds a certain length. In an example, all packets in a switch 104 are marked. The marked packets may be buffered in capture buffer 222 for further analysis to determine which flow caused the start condition.

In step 406, it is determined whether the end condition occurs. If the end condition has occurred, then the process proceeds to step 408. If the end condition does not occur, then the process continues to mark packets with certain attributes in step 404.

In step 408, the monitoring unit stops marking packets.

In step 410, the flow that caused the start condition is determined based on the marked packets and/or a report is generated based on the marked packets. For example, a report of attributes of marked packets or buffered marked packets is generated identifying the flow that caused the start condition. In another example, the report is a concatenation of buffered marked packets or headers of buffered marked packets. The report, buffered marked packets, or headers of buffered marked packets may be sent to processor 202 or to a receiver external to switch 104, for example a device 102. In an example, the report is generated by monitoring unit 220 or by processor 202.

Figure 5:
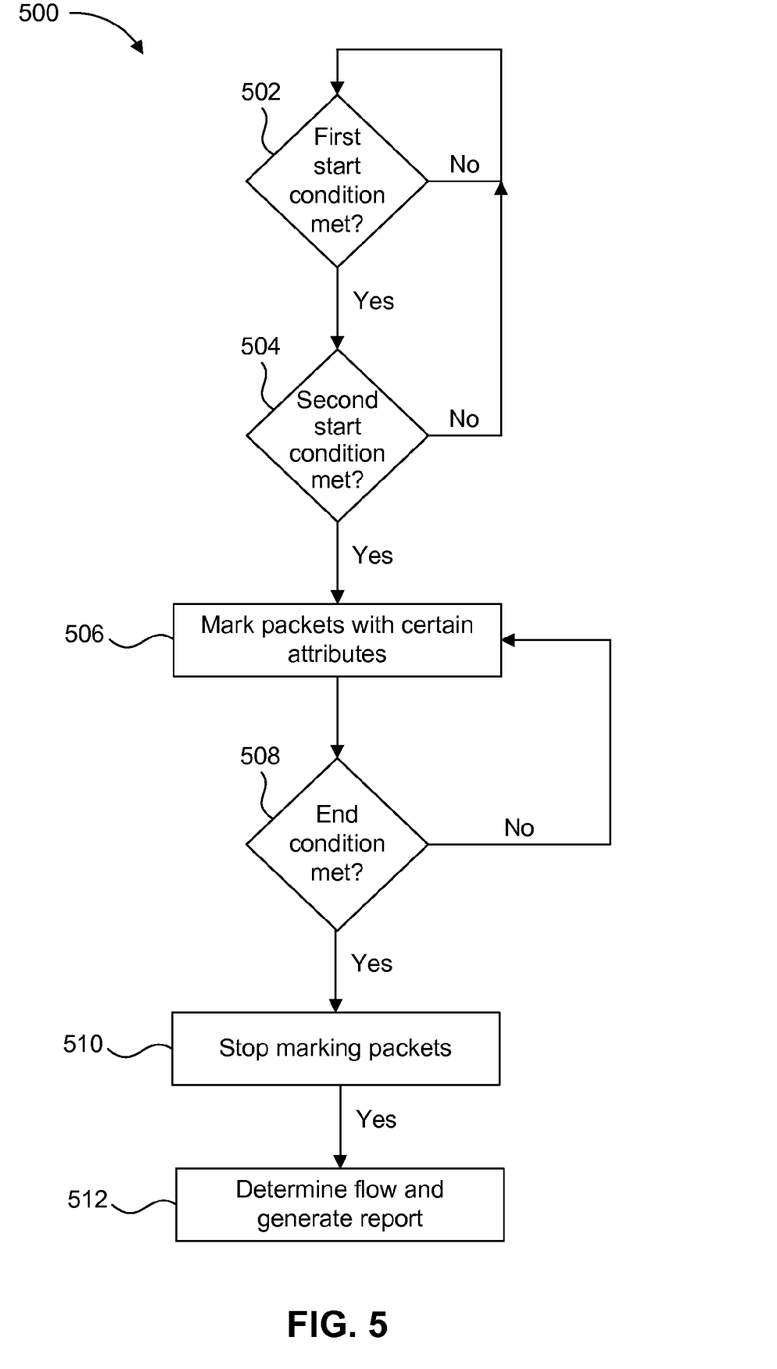
FIG. 5 illustrates an example flow chart illustrating steps to identify a flow that caused network congestion for multiple start conditions according to an embodiment of the disclosure.

FIG. 5 illustrates an example flow chart 500 illustrating steps to identify a flow that caused network congestion for multiple start conditions according to an embodiment of the disclosure. Flowchart 500 will be described with continued reference to the example operating environment depicted in FIG. 2. However, the flowchart is not limited to these embodiments. Note that some steps shown in flowchart 500 do not necessarily have to occur in the order shown. The steps in FIG. 5 are performed, for example, by monitoring unit 220.

In step 502, it is determined whether a first start condition has occurred. If the first start condition has occurred, then the process proceeds to step 504. If the first start condition has not occurred, then the process continues monitoring for whether the first start condition has occurred in step 502. In an example, the first start condition is that a queue with packets having a COS value of 0x2 has exceeded a certain length.

In step 504, it is determined whether a second start condition has occurred. If the second start condition has not occurred, then the process returns to step 502. In an example, the second start condition is that a queue with packets having a VLAN ID a value of 0x3f has exceeded a certain length. If the second start condition has occurred, then the process proceeds to step 506.

In step 506, the monitoring unit changes a first value in a packet to a second value when both the first start condition and the second start condition have occurred. For example, for a queue which has packets with a COS of 0x2 and a VLAN ID of 0x3f that has exceeded its queue length, monitoring unit changes bits 2 and 3 for those packets from a first value to a second value.

In step 508, it is determined whether the end condition has occurred. If the end condition has not occurred, then the monitoring unit 220 continues to mark packets in step 506.

In step 510, the monitoring unit stops marking packets.

In step 512, the flow that caused the start condition is determined based on the marked packets and/or a report is generated based on the marked packets. For example, a report of attributes of marked packets or buffered marked packets is generated identifying the flow that caused the start condition. In another example, the report is a concatenation of buffered marked packets or headers of buffered marked packets. The report, buffered marked packets, or headers of buffered marked packets may be sent to processor 202 or to a receiver external to switch 104, for example a device 102. In an example, the report is generated by monitoring unit 220 or by processor 202.

Figure 6:
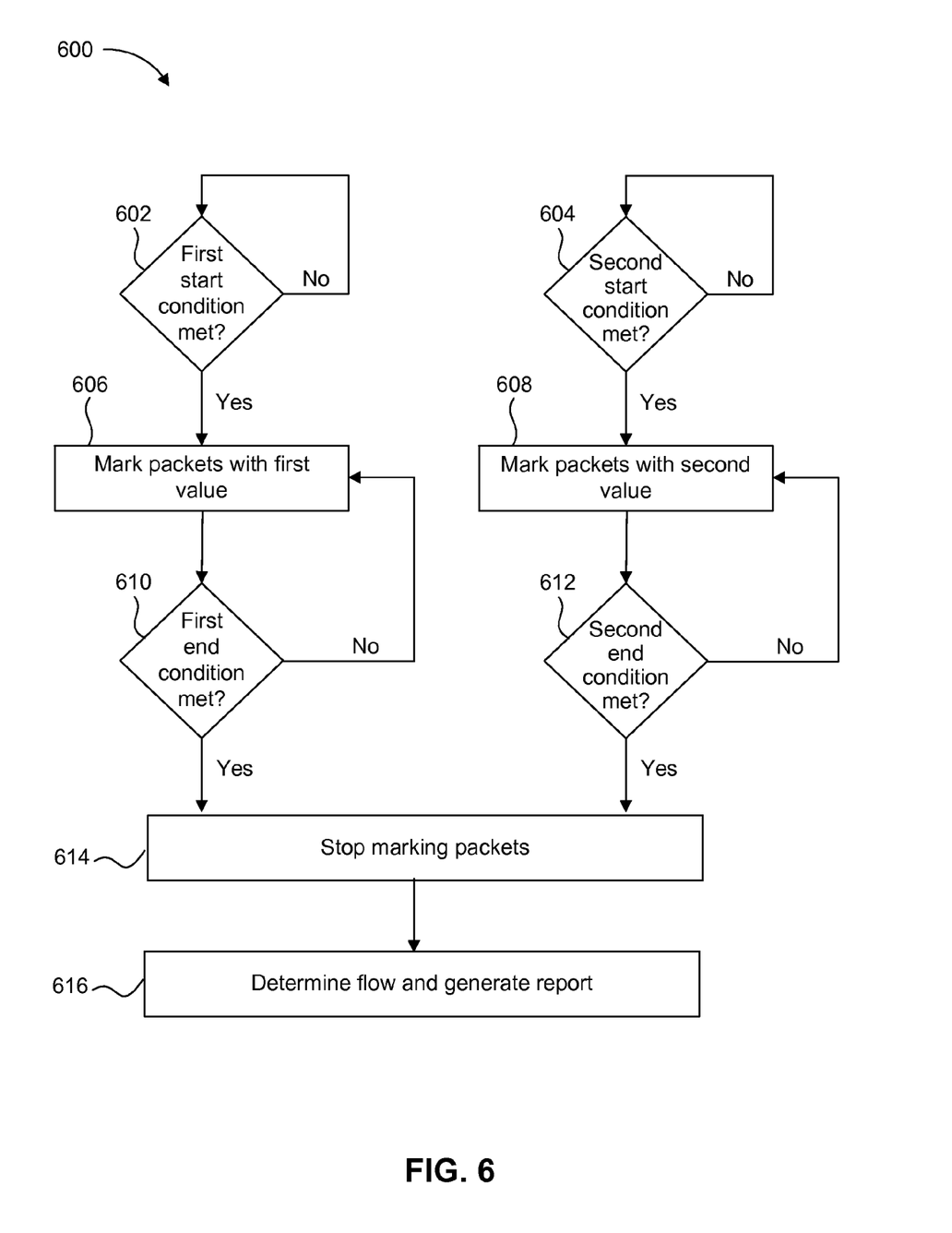
FIG. 6 illustrates an example flow chart illustrating steps to identify a flow that caused network congestion for multiple start conditions in parallel according to an embodiment of the disclosure.

FIG. 6 illustrates an example flow chart 600 illustrating steps to identify a flow that caused network congestion for multiple capture conditions in parallel according to an embodiment of the disclosure. Flowchart 600 will be described with continued reference to the example operating environment depicted in FIG. 2. However, the flowchart is not limited to these embodiments. Note that some steps shown in flowchart 600 do not necessarily have to occur in the order shown. The steps in FIG. 6 are performed, for example, by monitoring unit 220.

In step 602, it is determined whether a first start condition is met and in step 604 it is determined whether a second start condition is met. In this example, monitoring unit 220 based on whether either the first or the second start condition has occurred monitors and marks, for example, packets with certain attributes or all packets in a queue that exceeds a certain length. In an example, the first start condition is that a queue length is greater than a predetermine threshold and the second start condition is queues having a load imbalance greater than a predetermine percentage.

If the first start condition occurs, then the process proceeds to step 606. If the first start condition does not occur, then the process continues monitoring in step 602. If the second start condition occurs, then the process proceeds to step 608. If the second start condition does not occur, then the process continues monitoring in step 604.

In step 606, packets with certain attributes are marked with the first value. For example, bits 0 and 1 in packets for queues with a queue length greater than a predetermined threshold are changed to a first value. In step 608, packets with certain attributes are marked with a second value. For example, bits 2 and 3 in packets for queues with a load imbalance greater than a predetermine percentage are changed to a second value.

In step 610, it is determined whether the first end condition occurs and in step 612, it is determined whether the second end condition occurs. If the first end condition does not occur, then the process continues marking packets with first value in step 606. If the second end condition does not occur, then the process continues to mark packets with the second value in step 608. In an example, the first end condition is that the queue length is below the predetermined threshold and the second end condition is that the load imbalance is below the predetermined percentage.

In step 614, the monitoring unit stops marking packets.

In step 616, the flow that caused the start condition is determined based on the marked packets and/or a report is generated based on the marked packets. For example, a report of attributes of marked packets or buffered marked packets is generated identifying the flow that caused the start condition. In another example, the report is a concatenation of buffered marked packets or headers of buffered marked packets. The report, buffered marked packets, or headers of buffered marked packets may be sent to processor 202 or to a receiver external to switch 104, for example a device 102. In an example, the report is generated by monitoring unit 220 or by processor 202.

Figure 7:
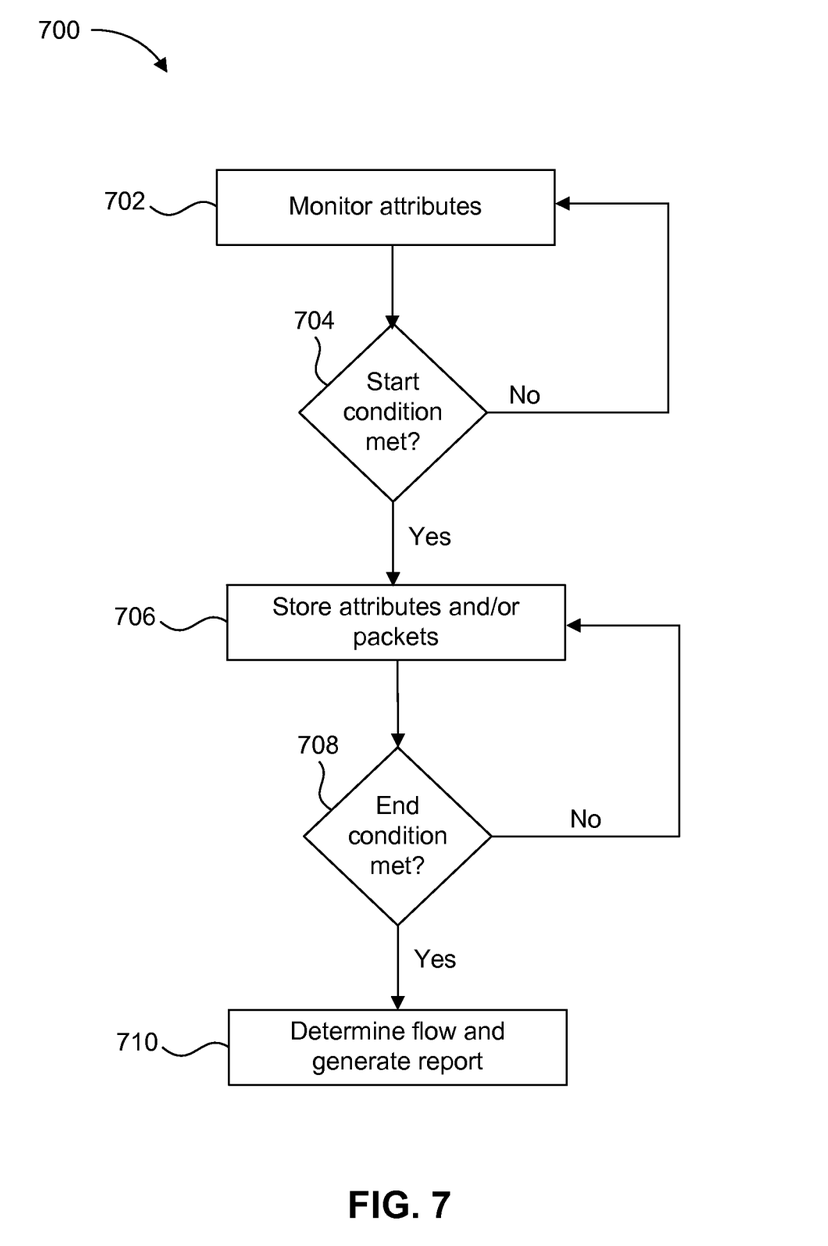
FIG. 7 illustrates an example flow chart illustrating steps to identify a flow that caused network congestion according to an embodiment of the disclosure.

FIG. 7 illustrates an example flow chart 700 illustrating steps to identify a flow that caused network congestion according to an embodiment of the disclosure. Flowchart 700 will be described with continued reference to the example operating environment depicted in FIG. 7. However, the flowchart is not limited to these embodiments. Note that some steps shown in flowchart 700 do not necessarily have to occur in the order shown. The steps in FIG. 7 are performed, for example, by monitoring unit 220.

In step 702, packets with predetermined attributes are monitored. For example, monitoring unit 220 continuously monitors packets with a certain VLAN ID or COS and collects statistics on these packets such as the number of incoming and outgoing packets and a time period for which they are in switch 104 regardless of whether a start condition has occurred. Monitoring unit 220 may also buffer a predetermined number of packets with certain attributes.

In step 704, it is determined whether a start condition has occurred. In an example, the start condition is whether a queue associated with the packets of predetermined attributes exceeds a certain predetermined length. If the start condition has occurred then the process proceeds to step 706. If the start condition has not occurred then the process continues to monitor packets and collect statistics in step 702.

In step 706, the statistics for packets with the predetermined attributes are stored and/or packets with the predetermined attributes are buffered. For example, monitoring unit 220 stores statistics for packets with the predetermined attributes and/or stores packets with the predetermined attributes in buffer 222.

In step 708, it is determined whether an end condition has occurred. In an example, the end condition is whether a queue associated with the packets of predetermined attributes is below the predetermined length. If the end condition has occurred, then the process proceeds to step 710. If the end condition has not occurred, then the process continues to monitor and store attributes and/or buffer packets in step 706.

In step 710, the flow that caused the start condition is determined and/or a report is generated as described above. In an example, a report of monitored attributes or buffered packets is generated identifying the flow that caused the start condition. In another example, the report is a concatenation of buffered packets or headers of buffered packets. The report, buffered packets, or headers of buffered packets may be sent to processor 202 or to a receiver external to switch 104, for example a device 102. In an example, the report is generated by monitoring unit 220 or by processor 202.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 8:
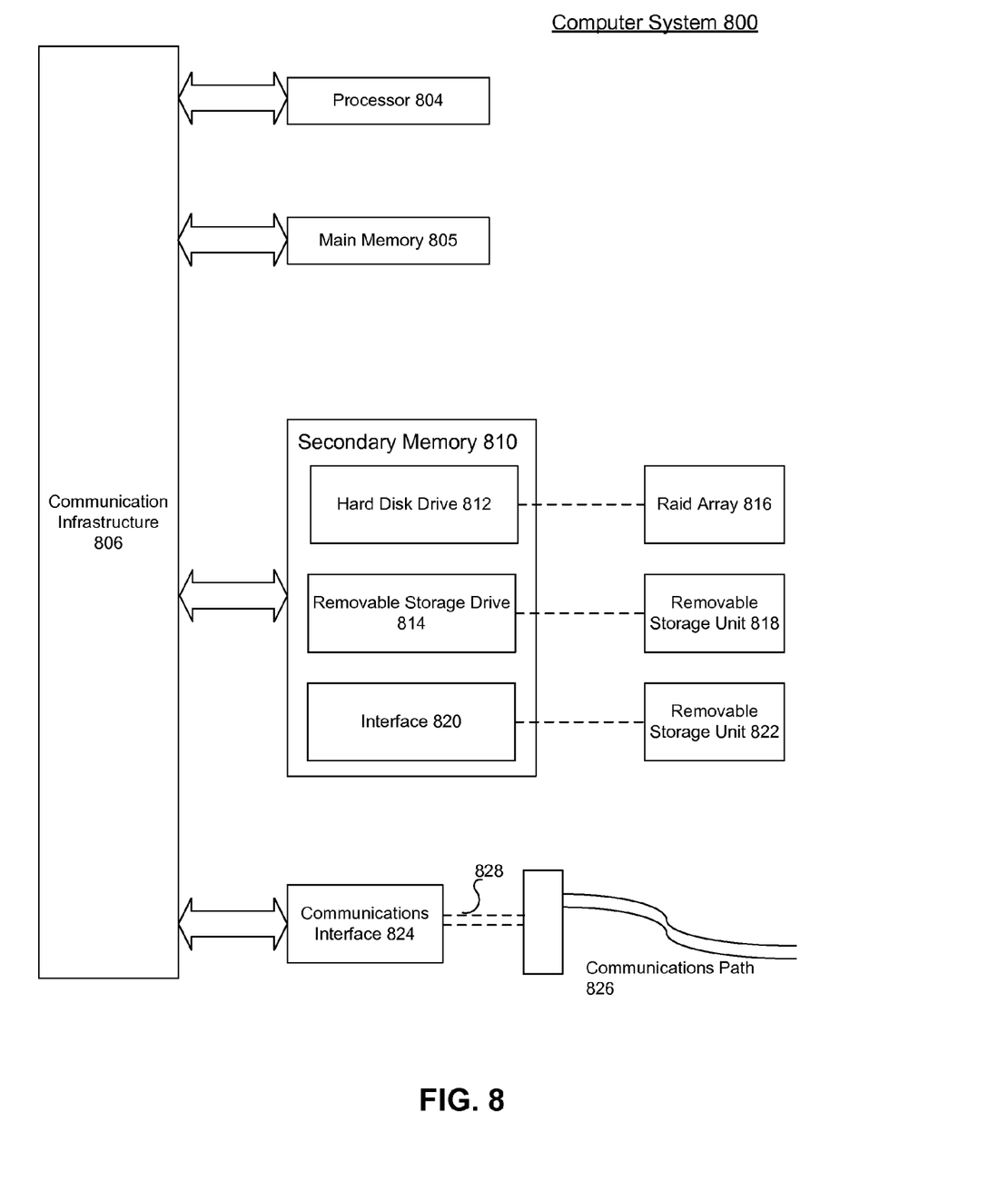
FIG. 8 is a block diagram of a computer system on which the present disclosure can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 8. The computer system 800 includes one or more processors, such as processor 804. Processor 804 can be a special purpose or a general purpose digital signal processor. The processor 804 is connected to a communication infrastructure 806 (for example, a bus or network). Various software implementations are described in terms of this exemplary computer system. After reading this description, it will become apparent to a person skilled in the relevant art how to implement the disclosure using other computer systems and/or computer architectures.

Computer system 800 also includes a main memory 805, preferably random access memory (RAM), and may also include a secondary memory 810. The secondary memory 810 may include, for example, a hard disk drive 812, and/or a RAID array 816, and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. As will be appreciated, the removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path 826. Communications path 826 carries signals 828 and may be implemented using wire or cable, fiber optics, a phone line, a cellular phone link, an RF link and other communications channels.

The terms "computer program medium" and "computer usable medium" are used herein to generally refer to media such as removable storage drive 814, a hard disk installed in hard disk drive 812, and signals 828. These computer program products are means for providing software to computer system 800.

Computer programs (also called computer control logic) are stored in main memory 805 and/or secondary memory 810. Computer programs may also be received via communications interface 824. Such computer programs, when executed, enable the computer system 800 to implement the present disclosure as discussed herein. In particular, the computer programs, when executed, enable the processor 804 to implement the processes of the present disclosure. For example, when executed, the computer programs enable processor 804 to implement part of or all of the steps described above with reference to the flowcharts herein. Where the disclosure is implemented using software, the software may be stored in a computer program product and loaded into computer system 800 using raid array 816, removable storage drive 814, hard drive 812 or communications interface 824.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof.

What is claimed is:

1. A system to monitor network congestion, comprising:
    an ingress port and an egress port;
    a plurality of queues coupled to the ingress port and the egress port and configured to store packets; and
    a monitoring unit configured to:
        when a start condition occurs:
            monitor an attribute of the packets in at least one queue of the plurality of queues, and
            mark a packet of the packets that has the attribute by changing a first value in the packet or in a metadata associated with the packet to a second value, and
        when an end condition occurs:
            stop monitoring the attribute,
            mark the packet by changing the second value in the packet or in the metadata associated with the packet to the first value,
            determine a flow that caused the start condition based on the attribute, and
            report the attribute and the flow.

2. The system of claim 1, wherein the start condition is one of a queue length or a virtual queue length greater than a first predetermined threshold; a sum of queue lengths or virtual queue lengths greater than a second predetermined threshold; unequal distribution of packets between members of an aggregation group greater than a predetermined percentage; packets enqueued in a queue of the plurality of queues for greater than a predetermined time period; or queue length, virtual queue length, sum of queue lengths or sum of virtual queue lengths, associated with a class of service (COS), Virtual Local Area Network (VLAN) Identification (ID), application, protocol, flow or type of user data greater than a third predetermined threshold.

3. The system of claim 1, further comprising:
    a buffer,
    wherein the monitoring unit is configured to, when the start condition occurs, buffer the packets or headers of the packets in the buffer for: all packets in a queue of the plurality of queues, all packets in a queue of the plurality of queues bound for a particular egress port, all packets bound for a particular link aggregation, or all packets corresponding to a particular (VLAN) Identification (ID) or Class of Service (COS).

4. The system of claim 3, wherein the monitoring unit is configured to, when the end condition occurs: send buffered packets, send concatenated headers of buffered packets, or send monitored attributes associated with buffered packets to a predetermined receiver.

5. The system of claim 1, wherein the attribute includes one or more of Virtual Local Area Network (VLAN) Identification (ID), class of service (COS), equal cost multi-path (ECMP) group member ID, timestamps of packets, or a number of packets associated with a particular flow that caused the start condition.

6. The system of claim 1, wherein the end condition includes one or more of: time elapsed since the start condition is greater than a predetermined period of time; a predetermined marking on a dequeued packet of the packets is a first value; a queue length or virtual queue length is below a first predetermined threshold; a sum of queue lengths or virtual queue lengths is below a second predetermined threshold; unequal distribution of packets between members of an aggregation group is less than a predetermined percentage; a buffer to store impacted packet information is full; or queue length, virtual queue length, sum of queue lengths or sum of virtual queue lengths, associated with a class of service (COS), Virtual Local Area Network (VLAN) Identification (ID), application, protocol, flow or type of user data less than a third predetermined threshold.

7. The system of claim 1, wherein the monitoring unit is configured to change a third value in the packet to a fourth value when both the start condition and a second start condition occur to track events corresponding to multiple start conditions.

8. The system of claim 1, wherein the monitoring unit is configured to change a third value in the packet to a fourth value when a second start condition occurs to track events corresponding to multiple start conditions in parallel.

9. A method to monitor network congestion, comprising:
    when a start condition occurs:
        monitoring an attribute of packets in a queue, and
        marking a packet of the packets that has the attribute by changing a first value in the packet or in a metadata associated with the packet to a second value; and
    when an end condition occurs:
        stop monitoring the attribute,
        marking the packet by changing the second value in the packet or in the metadata associated with the packet to the first value,
        determining a flow that caused the start condition based on the attribute, and
        reporting the attribute and the flow.

10. The method of claim 9, wherein the attribute includes one or more of Virtual Local Area Network (VLAN) Identification (ID), class of service (COS), equal cost multi-path (ECMP) group member ID, timestamps of packets, or a number of packets associated with a particular flow that caused the start condition.

11. The method of claim 9, wherein the end condition includes one or more of time elapsed since the start condition is greater than a predetermined period of time; a predetermined marking on a dequeued packet of the packets is a first value; a queue length or virtual queue length is below a first predetermined threshold; a sum of queue lengths or virtual queue lengths is below a second predetermined threshold; unequal distribution of packets between members of an aggregation group is less than a predetermined percentage; a buffer to store impacted packet information is full; or queue length, virtual queue length, sum of queue lengths or sum of virtual queue lengths, associated with a class of service (COS), Virtual Local Area Network (VLAN) Identification (ID), application, protocol, flow or type of user data less than a third predetermined threshold.

12. The method of claim 9, wherein the start condition is one of a queue length or a virtual queue length greater than a first predetermined threshold; a sum of queue lengths or virtual queue lengths greater than a second predetermined threshold; unequal distribution of packets between members of an aggregation group greater than a predetermined percentage; packets enqueued in a queue for greater than a predetermined time period; or queue length, virtual queue length, sum of queue lengths or sum of virtual queue lengths, associated with a class of service (COS), Virtual Local Area Network (VLAN) Identification (ID), application, protocol, flow or type of user data greater than a third predetermined threshold.

13. The method of claim 9, further comprising, when the start condition occurs, buffering the packets or headers of the packets for: all packets in the queue, all packets in the queue bound for a particular egress port, all packets bound for a particular link aggregation, or all packets corresponding to a particular (VLAN) Identification (ID) or Class of Service (COS).

14. The method of claim 13, further comprising, when the end condition occurs: sending buffered packets, sending concatenated headers of buffered packets, or sending monitored attributes associated with buffered packets to a predetermined receiver.

15. A system to monitor network congestion, comprising:
an ingress port and an egress port;
a plurality of queues coupled to the ingress port and the egress port and configured to store packets; and
a monitoring unit configured to:
when a start condition occurs:
monitor an attribute of the packets in at least one queue of the plurality of queues,
mark a packet of the packets that has the attribute by changing a first value in the packet or in a metadata associated with the packet to a second value, and
store the attribute or the packets, and
when an end condition occurs:
stop storing the attribute or the packets,
determine a flow that caused the start condition based on the attribute or stored packets,
mark the packet by changing the second value in the packet or in the metadata associated with the packet to the first value, and
report the attribute and the flow.

16. The system of claim 15, wherein the attribute includes one or more of Virtual Local Area Network (VLAN) Identification (ID), class of service (COS), equal cost multi-path (ECMP) group member ID, timestamps of packets, or a number of packets associated with a particular flow that caused the start condition.

17. The system of claim 15, wherein the end condition includes one or more of: time elapsed since the start condition is greater than a predetermined period of time; a predetermined marking on a dequeued packet of the packets is a first value; a queue length or virtual queue length is below a first predetermined threshold; a sum of queue lengths or virtual queue lengths is below a second predetermined threshold; unequal distribution of packets between members of an aggregation group is less than a predetermined percentage; a buffer to store impacted packet information is full; or queue length, virtual queue length, sum of queue lengths or sum of virtual queue lengths, associated with a class of service (COS), Virtual Local Area Network (VLAN) Identification (ID), application, protocol, flow or type of user data less than a third predetermined threshold.

18. The system of claim 15, wherein the start condition is one of a queue length or a virtual queue length greater than a first predetermined threshold; a sum of queue lengths or virtual queue lengths greater than a second predetermined threshold; unequal distribution of packets between egress links of a link aggregation (LAG); packets enqueued in a queue for greater than a predetermined time period; unequal distribution of packets between members of an aggregation group greater than a predetermined percentage; or queue length, virtual queue length, sum of queue lengths or sum of virtual queue lengths, associated with a class of service (COS), Virtual Local Area Network (VLAN) Identification (ID), application, protocol, flow or type of user data greater than a third predetermined threshold.

19. The system of claim 15, further comprising:
a buffer,
wherein when the start condition occurs, the monitoring unit is configured to buffer packets or packet headers in the buffer for: all packets in a queue, all packets in a queue bound for a particular egress port, all packets bound for a particular link aggregation, or all packets corresponding to a particular (VLAN) Identification (ID) or Class of Service (COS).

20. The system of claim 15, wherein when the end condition occurs, the monitoring unit is configured to: send buffered packets, send concatenated headers of buffered packets, or send monitored attributes associated with buffered packets to a predetermined receiver.

* * * * *